United States Patent
Lee et al.

(10) Patent No.: US 8,164,644 B2
(45) Date of Patent: Apr. 24, 2012

(54) METHOD AND APPARATUS FOR GENERATING MEDIA SIGNAL BY USING STATE INFORMATION

(75) Inventors: Yun-gu Lee, Yongin-si (KR); Byung-cheol Song, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 675 days.

(21) Appl. No.: 12/330,777

(22) Filed: Dec. 9, 2008

(65) Prior Publication Data

US 2009/0231457 A1   Sep. 17, 2009

(30) Foreign Application Priority Data

Mar. 14, 2008   (KR) .................. 10-2008-0023936

(51) Int. Cl.
*H04N 5/228* (2006.01)

(52) U.S. Cl. .................................................. 348/222.1
(58) Field of Classification Search ............... 348/222.1
See application file for complete search history.

(56) References Cited

U.S. PATENT DOCUMENTS

| | | | |
|---|---|---|---|
| 7,715,598 B2 * | 5/2010 | Li et al. | 382/118 |
| 7,889,886 B2 * | 2/2011 | Matsugu et al. | 382/103 |
| 2008/0117310 A1 * | 5/2008 | Kaneda et al. | 348/231.2 |
| 2009/0059021 A1 * | 3/2009 | Rimon et al. | 348/222.1 |
| 2010/0039527 A1 * | 2/2010 | Kretz et al. | 348/222.1 |
| 2010/0118163 A1 * | 5/2010 | Matsugu et al. | 348/231.99 |
| 2011/0090357 A1 * | 4/2011 | Rainier et al. | 348/222.1 |

* cited by examiner

*Primary Examiner* — James Hannett
(74) *Attorney, Agent, or Firm* — Sughrue Mion, PLLC

(57) ABSTRACT

Provided are a method and apparatus for generating a media signal by using state information. The method using the apparatus includes acquiring at least one type of state information selected from state information about a subject and state information about the apparatus, and generating a media signal by using the at least one type of state information.

28 Claims, 8 Drawing Sheets

US 8,164,644 B2

METHOD AND APPARATUS FOR GENERATING MEDIA SIGNAL BY USING STATE INFORMATION

CROSS-REFERENCE TO RELATED PATENT APPLICATIONS

This application claims the benefit of Korean Patent Application No. 10-2008-0023936, filed on Mar. 14, 2008, in the Korean Intellectual Property Office, the disclosure of which is incorporated herein in its entirety by reference.

BACKGROUND OF THE INVENTION

1. Field of the Invention

Methods and apparatuses consistent with the present invention relate to generating a media signal, and more particularly, to a method and apparatus for generating a media signal by using at least one type of state information selected from state information about a subject and state information about an apparatus for generating a media signal.

2. Description of the Related Art

As digital technologies develop, apparatuses for generating a media signal by photographing a subject have become widely available. Examples of these apparatuses include cameras, camcorders, personal digital assistants (PDAs) including a camera function, portable multimedia players (PMPs) including a camera function, mobile phones including a camera function, and navigation devices including a camera function. Users generate a media signal by photographing a desired subject with these apparatuses.

When a user wants to photograph him or herself, the user puts his or her camera on, for example, a tripod, moves to a desired location, and then automatically photographs him or herself after a predetermined time period and thereby generates a media signal. Alternatively, a user can photograph him or herself with a desired background, while holding his or her camera. However, when a user wants an image in which the user is positioned in a specific location, it is difficult to generate a media signal while the user is accurately positioned in the specific location.

Also, when a user takes a photograph without knowing that the state of a camera is not optimal for photographing due to defocusing or a user's hand-shake, an unclear image is formed. In addition, when the subject is a human being, a user can take a photograph without knowing that the subject closes his or her eyes or that the subject's face is not positioned completely or correctly on a screen.

As described above, when a user takes a photograph without any consideration of the fact that the state of the subject or camera is not optimal, an undesired media signal can be formed.

SUMMARY OF THE INVENTION

The present invention provides a method and apparatus for generating a media signal, informing a photographer who uses a camera or photographs a subject about the state of the camera or subject so as to photograph the subject when the state of the camera or subject is optimal.

The present invention also provides a method and apparatus for generating a media signal, automatically taking a photograph when the state of a camera or a subject is optimal.

According to an aspect of the present invention, there is provided a method of generating a media signal by using an apparatus for generating a media signal, the method including: acquiring at least one type of state information selected from state information about a subject and state information about the apparatus; and generating a media signal with respect to the subject by using the at least one type of state information.

The media signal is generated when a value of the at least one type of state information is within a predetermined reference value range.

The method further includes: receiving a request for formation of a media signal; and extracting a request time when formation of the media signal is required, wherein the media signal with respect to the subject is generated during a predetermined time period starting from the request time, when the value of the at least one type of state information is within the predetermined reference value range.

The method further includes, when the value of the at least one type of state information is outside the predetermined reference value range, generating and outputting reaction information indicating that the value of the at least one type of state information is outside the predetermined reference value range; and when the predetermined time period starting from the request time has not ended, after the reaction information is output, re-acquiring the at least one type of state information.

The method further includes generating a media signal with respect to the subject when the predetermined time period starting from the request time ends.

When at least two media signals are generated, the method further includes outputting one of the generated media signals.

When the media signal is not generated during the predetermined time period starting from the request time, the generating of the media signal with respect to the subject when the predetermined time period ends includes generating the media signal when the predetermined time period ends.

The state information about the subject may include at least one type of state information selected from information indicating an emotional state of the subject, information indicating whether a face of the subject is completely positioned on a screen of the apparatus, and information indicating whether the subject opens his or her eyes, and the state information about the apparatus includes at least one type of state information selected from information indicating whether the apparatus is in focus and information about an intensity of shaking of the apparatus.

When the value of the at least one type of state information is outside the predetermined reference value range, the method further includes: generating and outputting reaction information indicating that the value of the at least one type of state information is outside the predetermined reference value range; and after the reaction information is output, re-acquiring the at least one type of state information.

The reaction information is output as an audio signal through a speaker installed in the apparatus.

The outputting of the reaction information may include outputting information indicating whether the at least one type of state information is within the predetermined reference value range, by using a light of various colors emitted from a light emitting diode (LED) installed in the apparatus.

The outputting of the reaction information may include outputting a value of the reaction information corresponding to the value of the at least one type of state information onto a screen of the apparatus.

The method further includes: receiving a position information about where the subject is positioned on the screen of the apparatus; and storing the position information, wherein in the acquiring of the state information about the subject, the state information about the subject is a distance between a position of the subject on the screen of the apparatus and a position indicated according to the position information, on the screen of the apparatus.

The method further includes storing a first image information output on the screen of the apparatus, wherein the acquiring of the state information about the apparatus includes: comparing a second image information currently output on the screen of the apparatus with the first image information; and obtaining a degree of similarity between the first image information and the second image information as the state information.

According to another aspect of the present invention, there is provided an apparatus for generating a media signal, the apparatus includes: a state information acquisition unit acquiring at least one type of state information selected from state information about a subject and state information about the apparatus; a media signal generation unit generating a media signal with respect to the subject by using the at least one type of state information; and a control unit controlling the media signal generation unit to generate the media signal.

According to another aspect of the present invention, there is provided a computer-readable recording medium storing a program for performing a method of generating a media signal by using an apparatus for generating the media signal, the method including: acquiring at least one type of state information selected from state information about a subject and state information about the apparatus; and generating a media signal by using the at least one type of state information.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
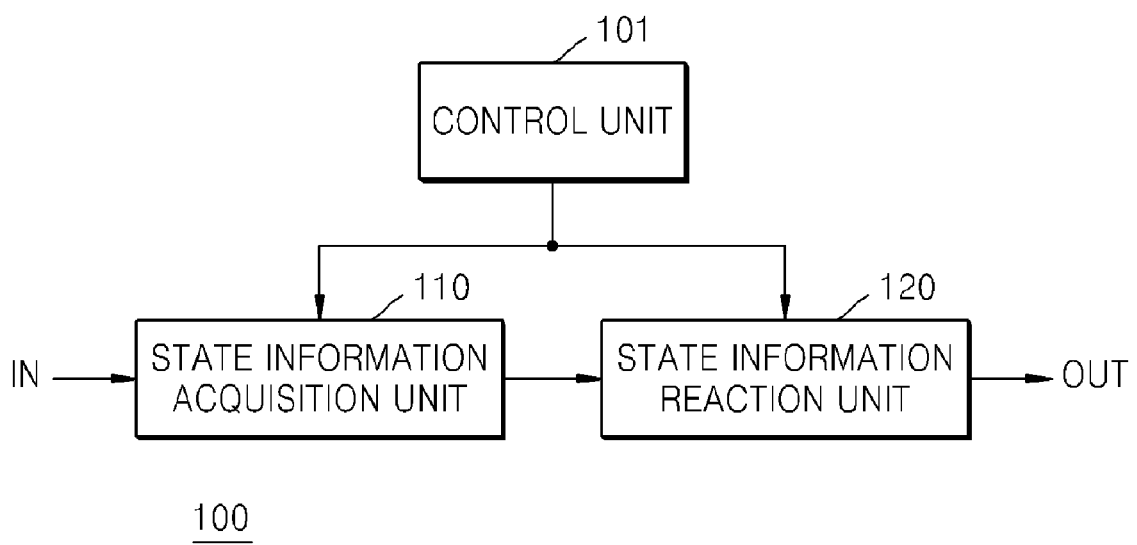
FIG. 1 is a schematic internal block diagram illustrating an apparatus for generating a media signal according to an embodiment of the present invention.

FIG. 1 is a schematic internal block diagram illustrating an apparatus 100 for generating a media signal according to an embodiment of the present invention. Referring to FIG. 1, the apparatus for generating a media signal 100 includes a control unit 101, a state information acquisition unit 110, and a state information reaction unit 120.

The apparatus 100 photographs a subject and generates a media signal corresponding to the photographed subject. The apparatus 100 may be a camcorder, a camera, a personal digital assistant (PDA) including a camera function, a portable multimedia player (PMP) including a camera function, a mobile phone including a camera function, a navigation device including a camera function, or a notebook computer including a camera function. The state information acquisition unit 110 acquires state information about the subject or the apparatus 100. Examples of the state information about the subject include emotional state information indicating an emotional state of the subject, information indicating whether the subject's face is positioned completely or correctly on a screen (not shown) of the apparatus 100, and information indicating whether the subject opens his or her eyes.

Examples of the state information about the apparatus 100 include information indicating whether the apparatus 100 is in focus, information indicating whether the apparatus 100 is shaken due to, for example, a user's hand-shake, and if the apparatus 100 is shaken, information about the intensity of the shaking. The state information acquisition unit 110 sends a state information value to the state information reaction unit 120.

The state information reaction unit 120 determines whether the state information value received from the state information acquisition unit 110 is within a predetermined reference value range. When the state information value received from the state information acquisition unit 110 is within the predetermined reference value range, the state information reaction unit 120 generates a media signal. On the other hand, when the state information value received from the state information acquisition unit 110 is outside the predetermined reference value range, the state information reaction unit 120 generates reaction information. A method performed by the state information reaction unit 120 to generate a media signal by using the state information will be described in detail with reference to FIG. 2.

The control unit 101 controls the apparatus 100 to perform a method of generating a media signal according to the present invention. The control unit 101 includes an arithmetic logic unit (ALU) for performing calculations, and a register for temporarily storing data and instructions. The control unit 101 controls the state information acquisition unit 110 to acquire the state information about the subject or the state information about the apparatus 100. Also, the control unit 101 controls the state information acquisition unit 110 such that the state information reaction unit 120 determines whether the value of the state information obtained by the state information reaction unit 120 is within the predetermined reference value range. When the value of the state information is within the predetermined reference value range, the control unit 101 controls the state information acquisition unit 110 such that the state information reaction unit 120 generates a media signal. On the other hand, when the value of the state information is outside the predetermined reference value range, the control unit 101 controls the state information acquisition unit 110 such that the state information reaction unit 120 generates reaction information.

Figure 2:
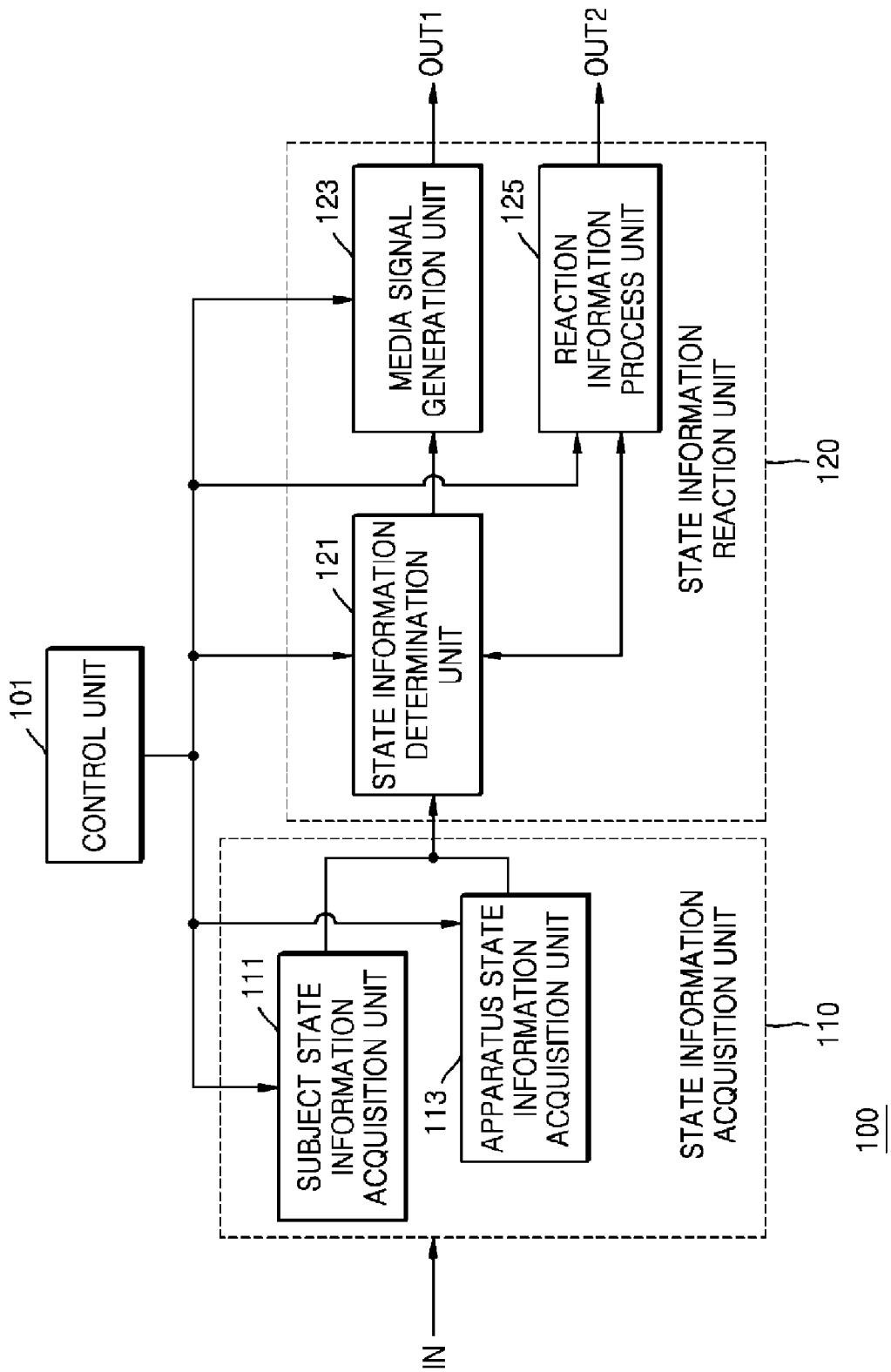
FIG. 2 is a specified internal block diagram of the apparatus of FIG. 1.

FIG. 2 is a specified internal block diagram of the apparatus 100 of FIG. 1. Referring to FIG. 2, the apparatus 100 includes the control unit 101, the state information acquisition unit 110, and the state information reaction unit 120. Although not shown in FIG. 2, the apparatus 100 may further include a user interface enabling interaction with a user and a media signal output unit outputting the media signal.

The state information acquisition unit 110 includes a subject state information acquisition unit 111 and an apparatus state information acquisition unit 113, and the state information reaction unit 120 includes a state information determination unit 121, a media signal generation unit 123, and a reaction information process unit 125.

The subject state information acquisition unit 111 acquires state information about a subject. When the subject to be photographed by the apparatus 100 is a person, the subject state information acquisition unit 111 may acquire information about the person's emotional state. To do this, the subject state information acquisition unit 111 extracts information about a face of the subject from image data of the subject input to the screen (not shown) of the apparatus 100 and extracts feature points from the facial information so as to extract information about the person's facial expression. The subject state information acquisition unit 111 may determine the emotional state of the subject by determining the person's emotional state information with the facial expression information. The emotional state of the subject may be determined as a plurality of emotional states or as one emotional state.

The subject state information acquisition unit 111 divides the emotional state of the subject into various emotional states, such as happiness, sadness, anger, surprise, or frown, obtains respective emotional states in values, and determines that the general emotional state of the subject is an emotional state of the largest value. When the subject smiles, the subject state information acquisition unit 111 obtains a value of each emotional state of the subject, and determines that the emotional state of the subject is one emotional state, that is, happiness, based on the fact that the value of the emotional state of happiness is largest.

In addition to the emotional state information, the subject state information acquisition unit 111 may acquire, as the state information about the subject, information indicating whether the face of the subject is entirely viewed on the screen of the apparatus 100 or information indicating whether the subject opens his or her eyes. In addition, when a user defines a position of the subject on the screen of the apparatus 100 through a user interface, the subject state information acquisition unit 111 acquires, as state information about the subject, information about a difference between the current position of the subject on the screen of the apparatus 100 and the position defined by the user on the screen of the apparatus 100.

The apparatus state information acquisition unit 113 acquires state information about the apparatus 100. The apparatus state information acquisition unit 113 generates, as the state information about the apparatus 100, information indicating whether the apparatus 100 is in focus, or information about the intensity of shaking of the apparatus 100. Also, the apparatus 100 may temporarily store a screen image desired by a user and then acquire a degree of similarity between the temporality stored screen image and an image currently viewed on the screen 503 (see FIG. 5) of the apparatus 100, as state information. The subject state information acquisition unit 111 and/or the apparatus state information acquisition unit 113 send a value of the state information about the subject and/or a value of the state information about the apparatus 100 to the state information determination unit 121.

The state information determination unit 121 determines whether the value of the state information received from at least one of the subject state information acquisition unit 111 and the apparatus state information acquisition unit 113 is within a predetermined reference value range. When the state information determination unit 121 receives the value of the state information from the state information acquisition unit 110, the state information determination unit 121 determines the type of the state information, extracts a predetermined reference value range corresponding to the type of the state information, and determines that the value of the state information is within the predetermined reference value range.

The state information determination unit 121 stores predetermined reference value ranges for respective state information. That is, the state information determination unit 121 includes predetermined reference value ranges for respective emotional states of the subject, such as happiness, sadness, anger, or frown, a predetermined reference value range for a degree of inclusion of the subject's face in the screen, and a predetermined reference value range for a degree of shaking of the apparatus 100. When the value of the state information is within the predetermined reference value range, the state information determination unit 121 informs the media signal generation unit 123 that this is the case. On the other hand, when the value of the state information is outside the predetermined reference value range, the state information determination unit 121 informs the reaction information process unit 125 that this is the case. The inclusion of the value of the state information within the predetermined reference value means that the state information about the subject or the state information about the apparatus 100 is good enough to satisfy a predetermined reference value.

When the value of the state information is within the predetermined value range, the media signal generation unit 123 captures an image viewed on the screen of the apparatus 100 and thus, a media signal is generated.

When the value of the state information is outside the predetermined reference value range, the reaction information process unit 125 generates and outputs reaction information indicating that the value of the state information is outside the predetermined reference value range. The reaction information is a type of information that informs a photographer or a subject about the current state of the apparatus 100 or the subject, and is used to generate a media signal when the state of the apparatus 100 or the subject is optimal.

The reaction information process unit 125 includes a reaction information generation unit (not shown) and a reaction information output unit (not shown). The reaction information generation unit may generate various types of reaction information. For example, the reaction information generation unit may generate reaction information in the form of an audio signal, such as a voice, or in the form of a light of a light emitting diode (LED). In addition, the reaction information generation unit may generate reaction information using the state information value or an index in proportion to the value of the state information as reaction information. When the reaction information is generated in the form of an audio signal, the reaction information output unit may output the reaction information through, for example, a speaker. When the reaction information is generated in the form of a light of a LED, the reaction information output unit may output the reaction information by changing the color of the light of the LED. When the reaction information is a state information value or is converted into an index in proportion to the state information value, the reaction information output unit may output the reaction information as a value or in the form of graph.

The control unit 101 controls the apparatus 100 according to an order input by a user through a user interface. In this specification, the user is a person who generates a media signal with the apparatus 100, that is, a photographer. When a user requests generation of a media signal through a user interface, the control unit 101 controls the state information acquisition unit 110 to acquire state information. The control unit 101 controls the state information reaction unit 120 to generate a media signal by using the state information. Specifically, the control unit 101 controls the state information determination unit 121 and determines whether a state information value acquired by the state information acquisition unit 110 is within a predetermined reference value range. When the state information value is within the predetermined reference value range, the control unit 101 determines that the state of the subject or the apparatus 100 is good to be a predetermined level or more, controls the media signal generation unit 123 and captures an image viewed on the screen of the apparatus 100, thereby generating a media signal.

When the state information of the control unit 101 is outside the predetermined reference value range, the control unit 101 determines that the state of the subject or the apparatus 100 is bad, and controls the reaction information process unit 125 to output the reaction information corresponding to the state information. When the reaction information process unit 125 generates and outputs the reaction information, the control unit 101 controls the state information acquisition unit 110 to re-acquire state information about the current state of the subject or the apparatus 100. When the reaction information process unit 125 generates and outputs the reaction information, the subject or the photographer may recognize that the state of the subject and/or the apparatus 100 is bad, and thus the subject or the photographer may improve the bad state. When the state information acquisition unit 110 re-acquires the state information about the current state of the subject or the apparatus 100, a value of the re-acquired state information is closer to a predetermined reference value range than the value of the previously acquired state information. This acquisition process is repeatedly performed so that when the state information is within the predetermined reference value range, the photographer photographs an image viewed on the screen. Therefore, a media signal can be generated when the state of the subject or the apparatus 100 is better.

In some cases, when the user requests formation or generation of a media signal through the user interface, the control unit 101 extracts a request time which is a time when formation or generation of a media signal is requested, and controls the apparatus 100 to generate a media signal during a predetermined time period starting from the request time. When a state information value is outside a predetermined reference value range, after the reaction information is output, the control unit 101 determines whether a predetermined time period starting from the request time has ended. When the predetermined time period has not ended, the control unit 101 controls the state information acquisition unit 111 to re-acquire current state information about the apparatus 100 and the subject.

When the state information value is within the predetermined reference value range and the predetermined time period starting from the request time has not ended, the control unit 101 may continue to control the media signal generation unit 123 to generate a media signal. After the reaction information is output, when the predetermined time period starting from the request time ends, the control unit 101 controls the media signal generation unit 123 to generate a media signal. The generation of the media signal by the media signal generation unit 123 controlled by the control unit 101 may be performed only when the state information value is outside the predetermined reference value range during the predetermined time period starting from the request time and thus a media signal is not generated within the predetermined time period.

When a plurality of media signals are generated, the media signal output unit may output all the media signals in a form of a thumbnail image on a screen, one media signal selected by a user, or a media signal generated when a state information value is most close to a predetermined reference value range.

The user interface enables interaction with a user. An order of the user is transmitted to the control unit 101 through the user interface. Examples of the user interface include a physical transducer, such as a keyboard, a mouse, a touchscreen, or a microphone. The user inputs an order, a letter, a numeral, or audio information through the user interface and the user interface informs the control unit 101 about the input order, letter, numeral, or audio information.

The media signal output unit outputs a general state of the apparatus 100 or information input by a user with the user interface, through a screen or speaker. The media signal output unit includes a display unit (not shown) outputting a video signal and a speaker (not shown) outputting an audio signal, and outputs a media signal included in the apparatus 100. The media signal output unit may further include an on screen display (OSD) process unit generating and outputting a user control list.

Figure 3:
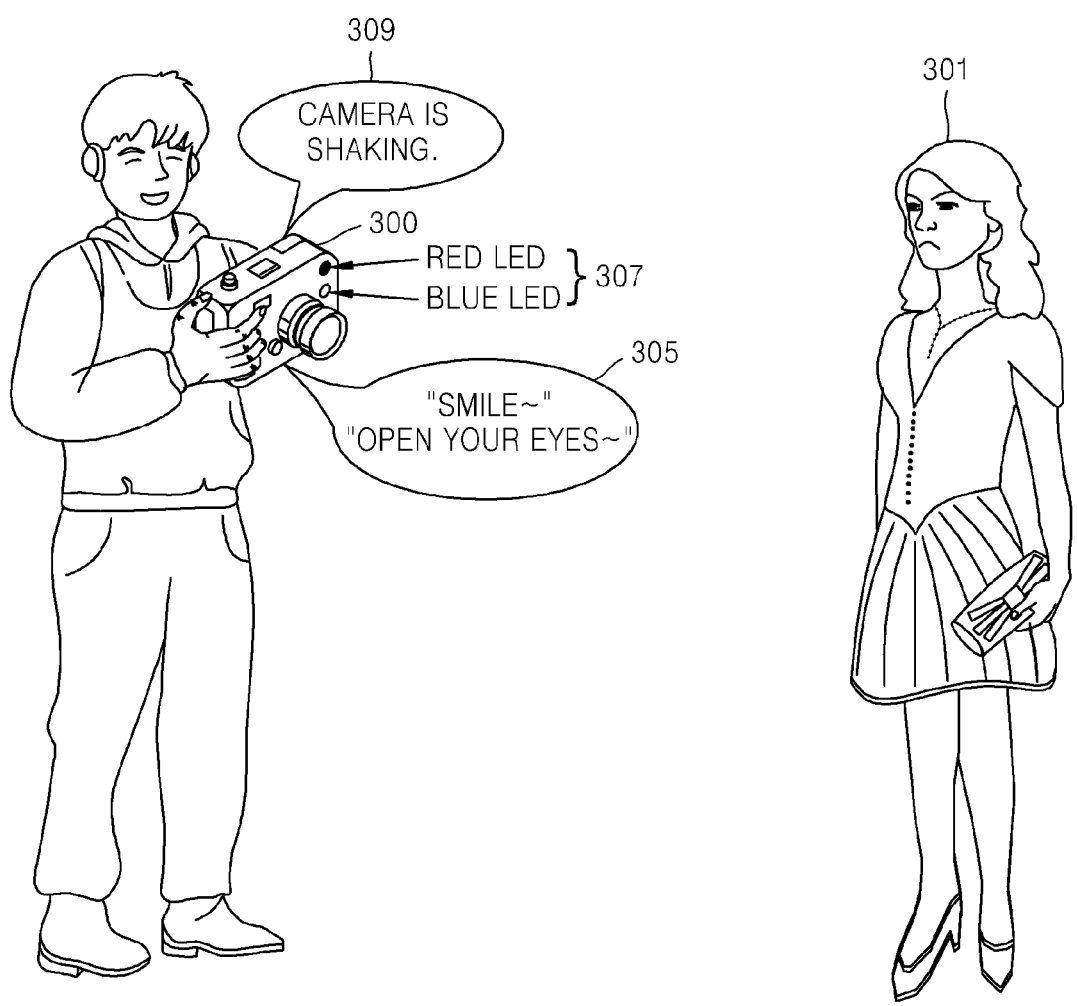
FIG. 3 is a view for explaining outputting of reaction information by an apparatus for generating a media signal, according to an embodiment of the present invention.

FIG. 3 is a view for explaining outputting of reaction information by an apparatus 300 for generating a media signal, according to an embodiment of the present invention. Referring to FIG. 3, a user or a photographer photographs a subject 301 with the apparatus 300. In FIG. 3, the subject 301 is a woman. When the photographer photographs the subject 301 by using the apparatus 300, the apparatus 300 may acquire state information about the subject 301, such as an emotional state of the subject 301, state information indicating whether the subject 301 blinks, or state information indicating whether the subject 301 closes her eyes.

The subject 301 illustrated in FIG. 3 frowns and closes her eyes. In addition, a face of the subject 301 is not completely or correctly positioned on a screen (not shown) of the apparatus 300, and the apparatus 300 shakes due to a hand-shake of the photographer. The apparatus 300 acquires state information indicating that the subject 301 frowns and closes her eyes, state information indicating that the face of the subject 301 is not completely or correctly positioned on the screen, and state information indicating that the apparatus 300 is shaking due to the hand-shake of the photographer. The apparatus 300 determines whether respective acquired state information is within predetermined reference value ranges stored in the apparatus 300.

In FIG. 3, the apparatus 300 may determine that the emotional state of the subject 301 is bad because the subject 301 frowns and determines that a state information value, such as corresponding to happiness or laugh, is outside a predetermined reference value range. Also, the apparatus 300 may determine that a state information value about the size of an eye is outside a predetermined reference value range because the subject 301 closes her eyes, and determines that state information about a percentage of the face that should be viewed on the screen is outside a predetermined reference value range because the face of the subject 301 is not completely or correctly positioned on the screen. The apparatus 300 may determine that a state information value about a degree of non-shaking is outside a predetermined reference value range because the apparatus 300 is shaken a lot due to a hand-shake of the photographer.

The apparatus 300 generates and outputs reaction information indicating that each state information value is outside a predetermined reference value. In FIG. 3, the apparatus 300 outputs a voice saying, for example, such as "smile" or "open your eyes", through a speaker (not shown), as reaction information. Since the reaction information is generated based on the state information about the subject 301 in order to improve the state of the subject 301, the reaction information may be output loudly so that the subject 301 can hear the voice. Also, the audio signal may be output in a cheerful and humorous voice to make the subject 301 laugh. In FIG. 3, the apparatus 300 outputs a voice saying "the camera is shaking" with a large sound so that the photographer hears the voice. In addition, in FIG. 3, when the apparatus 300 is designed to indicate whether the subject 301 closes her eyes by using an LED, the apparatus 300 may output reaction information corresponding to the state information that the subject 301 closes her eyes by causing a red LED to blink. When the subject 301 sees the blinking red LED, the subject 301 may open her eyes. Therefore, the subject 301 may not be photographed when she closes her eyes.

Figure 4:
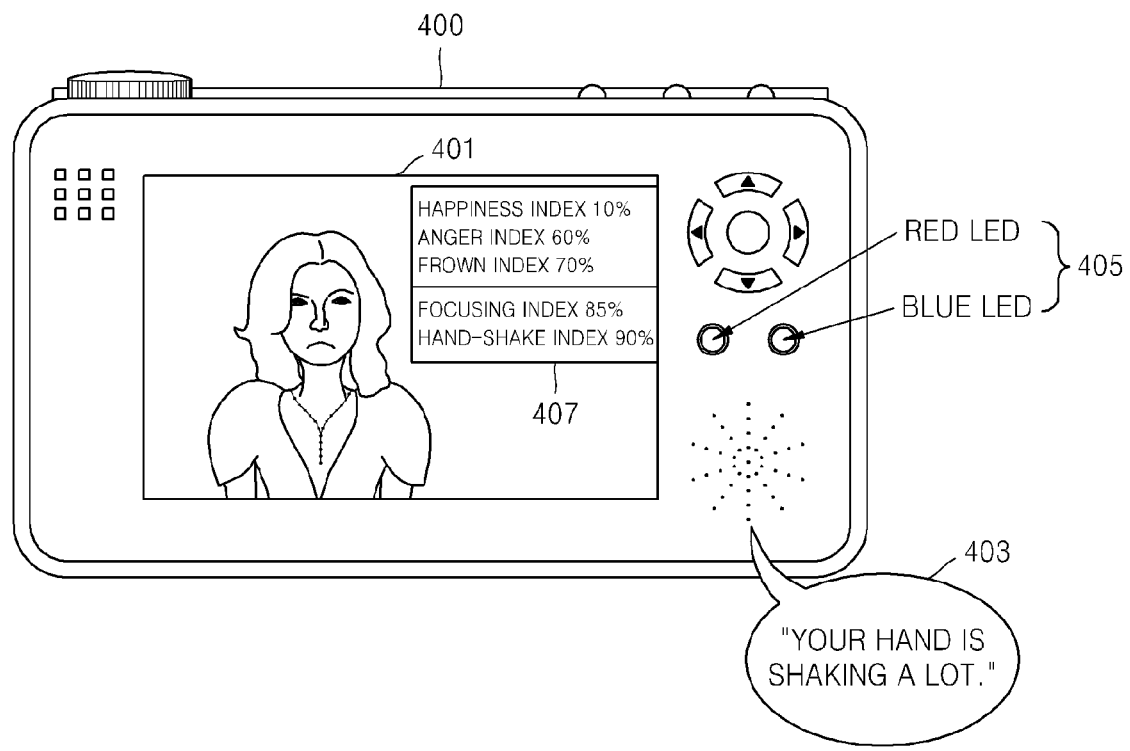
FIG. 4 is a view for explaining outputting of reaction information by an apparatus for generating a media signal, according to another embodiment of the present invention.

FIG. 4 is a view for explaining outputting of reaction information by an apparatus 400 for generating a media signal, according to another embodiment of the present invention. Referring to FIG. 4, an image of a subject 301 to be photographed is output on a screen 401 of the apparatus 400. The apparatus 400 may generate and output reaction information by using state information about the subject 301 or state information about the apparatus 400. In FIG. 4, the apparatus 400 outputs a voice saying "your hand is shaking a lot" as reaction information. Also, the apparatus 400 outputs reaction information about the state information indicating whether the subject 301 closes her eyes by using different colors of an LED 405. That is, since the subject 301 closes her eyes, a red LED of the LED 405 blinks to inform the photographer of the state information indicating that the subject 301 closes its eyes. In this case, the photographer recognizes that the subject 301 closes her eyes and asks the subject 301 to open her eyes. The apparatus 400 may output reaction information corresponding to the state information about the subject 301 or the state information about the apparatus 400 in values on an OSD in the screen 401.

Figure 5:
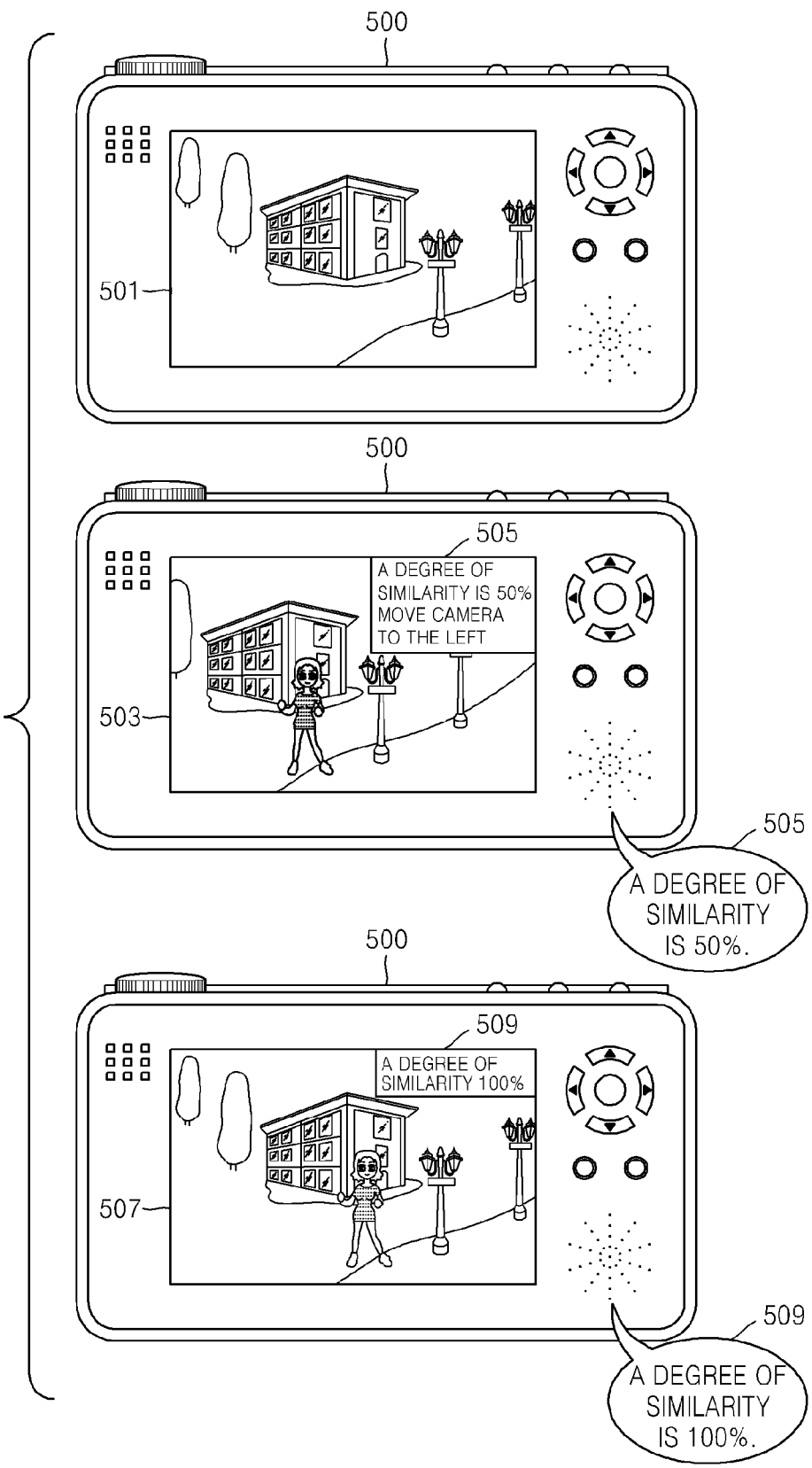
FIG. 5 is a view for explaining outputting of reaction information by an apparatus for generating a media signal, according to another embodiment of the present invention.

FIG. 5 is a view for explaining outputting of reaction information by an apparatus 500 for generating a media signal, according to another embodiment of the present invention. Referring to 5, a user finds a target background to be photographed and viewed on a screen 501 of the apparatus 500 by using the apparatus 500. The user may temporarily store the image viewed on the screen 501 of the apparatus 500. Hereinafter, the image temporarily stored by the apparatus 500 is referred to as a first image. If the user wants to photograph him or herself with the background, the user may ask other people to take a photograph of him, by using the apparatus 500, and may move to the desired background.

Then, the other people may find a background in which the user is positioned to be viewed on the screen 503 of the apparatus 500 by using the apparatus 500. In this case, the apparatus 500 extracts the first image that has been stored in the apparatus 500 and determines whether an image (hereinafter referred to as a second image) currently viewed on the screen 503 of the apparatus 500 is identical to the first image. The apparatus 500 acquires a degree of similarity between the first image and the second image as state information and determines that the degree of similarity between the first image and the second image is within a predetermined reference value range. When the degree of similarity between the first image and the second image is outside the predetermined reference value range, the apparatus 500 generates and outputs reaction information indicating that the degree of similarity between the first image and the second image is outside the predetermined reference value range.

As described above, the reaction information may be output in the form of an audio signal, the color of light emitted from an LED, or an OSD output on a screen of the apparatus 500. In FIG. 5, the second image is shifted to the right side of the first image. In this case, as illustrated in FIG. 5, the apparatus 500 outputs the reaction information in the form of a caption 505 reading "similarity index 50%" indicating that the degree of similarity of the first image and the second image is 50%, and "move the screen to the left" on the screen 503, or in the form of a voice 505 making the same comments. The other people sees the caption 505 output on the screen 503 of the apparatus 500 or hears the voice 505, recognizes the reaction information, and responds to the reaction information by shifting the apparatus 500 so as to move a lens of the apparatus 500 to the left. When the degree of similarity of the first image and the second image currently viewed on a screen 507 of the apparatus 500 is within the predetermined reference value range, the apparatus 500 generates reaction information 509 indicating that this is the case and photographs a second image currently viewed on the screen 503, thereby generating a media signal.

Figure 6:
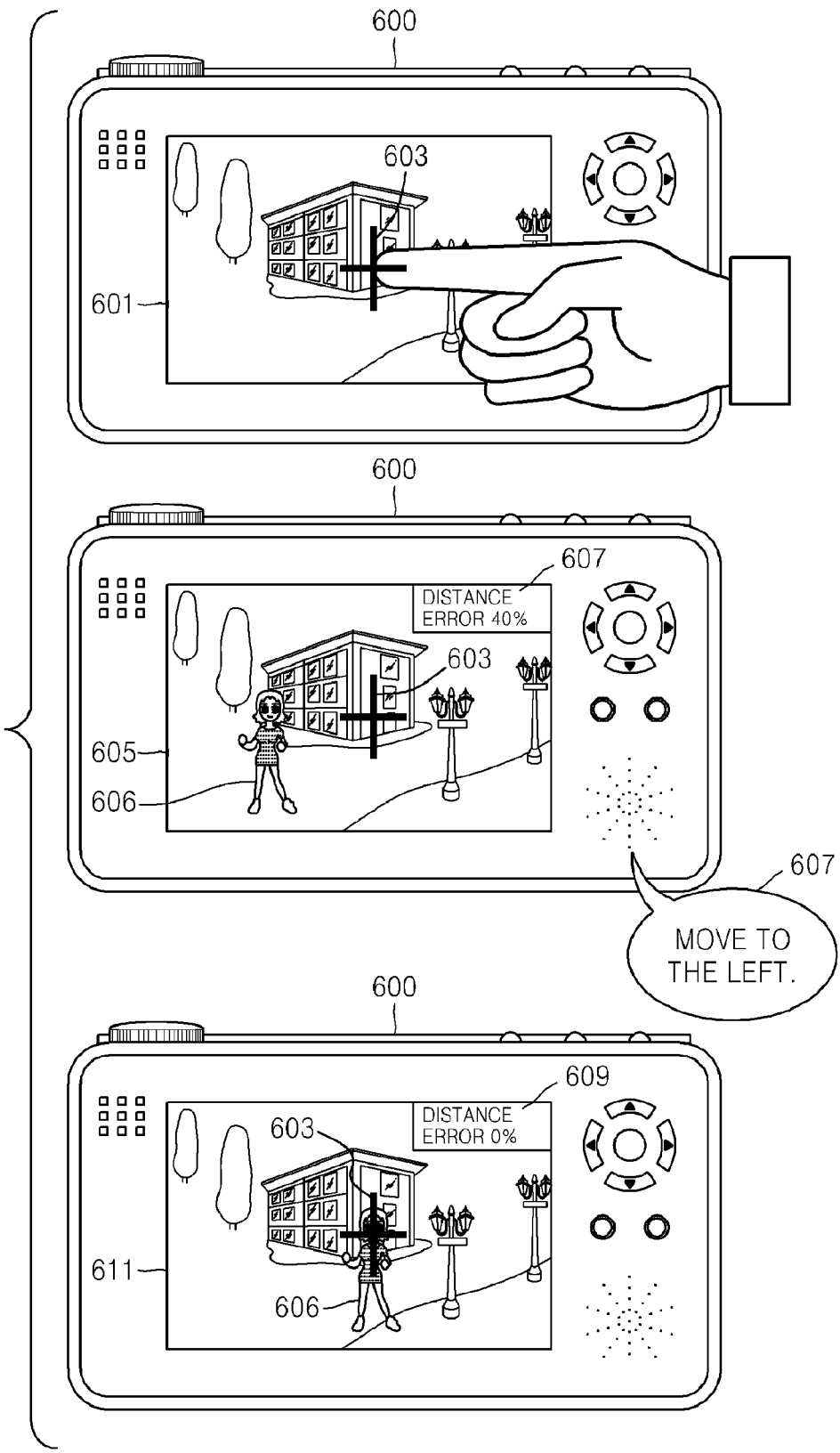
FIG. 6 is a view for explaining outputting of reaction information by an apparatus for generating a media signal, according to another embodiment of the present invention.

FIG. 6 is a view for explaining outputting of reaction information by an apparatus 600 for generating a media signal, according to another embodiment of the present invention. Referring to FIG. 6, a user finds a background to be photographed and viewed on a screen 601 of the apparatus 600 by using the apparatus 600. The user may input a target point 603 at which the user wants to be positioned in the image viewed on the screen 601 of the apparatus 600 by using a user interface (not shown). The user may input the target point 603 by using various user interfaces, such as a touchscreen, a touch pad, a mouse, or a keyboard. The apparatus 600 temporarily stores the target point 603 input by the user and an image including the target point 603. Hereinafter, the target point which is input by the user and temporarily stored by the apparatus 600 will be referred to as a first point 603. When the user wants to photograph him or herself as a subject with a background, the user may ask other people to photograph him or her, by using the apparatus 600, or may put the apparatus 600 on, for example, a tripod and move to the desired background.

When the user moves to the desired background, the apparatus 600 extracts information about the first point 603 and the image including the first point 603 which have been stored in advance and displays the first point 603 input by the user in the currently viewed image on the screen 605 of the apparatus 600. The apparatus 600 may acquire a distance between the first point 603 and a current position 606 of the user (hereinafter, referred to as a second point) as state information. When the distance between the first point 603 and the second point 606 is outside a predetermined reference value range, the apparatus 600 generates and outputs reaction information.

In FIG. 6, the apparatus 600 outputs the distance between the first point 603 and the second point 606 on the screen 605 in a caption 607 reading "distance error 40%." When the other people see the caption 607, they may tell the user about the information, that is, that there is a discrepancy between the first point 603 and the second point 606. Alternatively, the apparatus 600 may make a red LED blink so as to inform that the distance between the position of the user and the first point 603 is outside the predetermined reference value range. In addition, in FIG. 6, the apparatus 600 outputs a voice 607 saying "move to the left" as reaction information. Therefore, the user may recognize that his or her current position is away from the first point 603 by using reaction information output by the apparatus 600. When the distance between the first point 603 and the second point 606 is within the predetermined reference value range, the apparatus 600 outputs a caption 609 reading "distance error 0%" on a screen 611 of FIG. 6, and captures the currently viewed image on the screen 611 of the apparatus 600 and generates a media signal.

Figure 7:
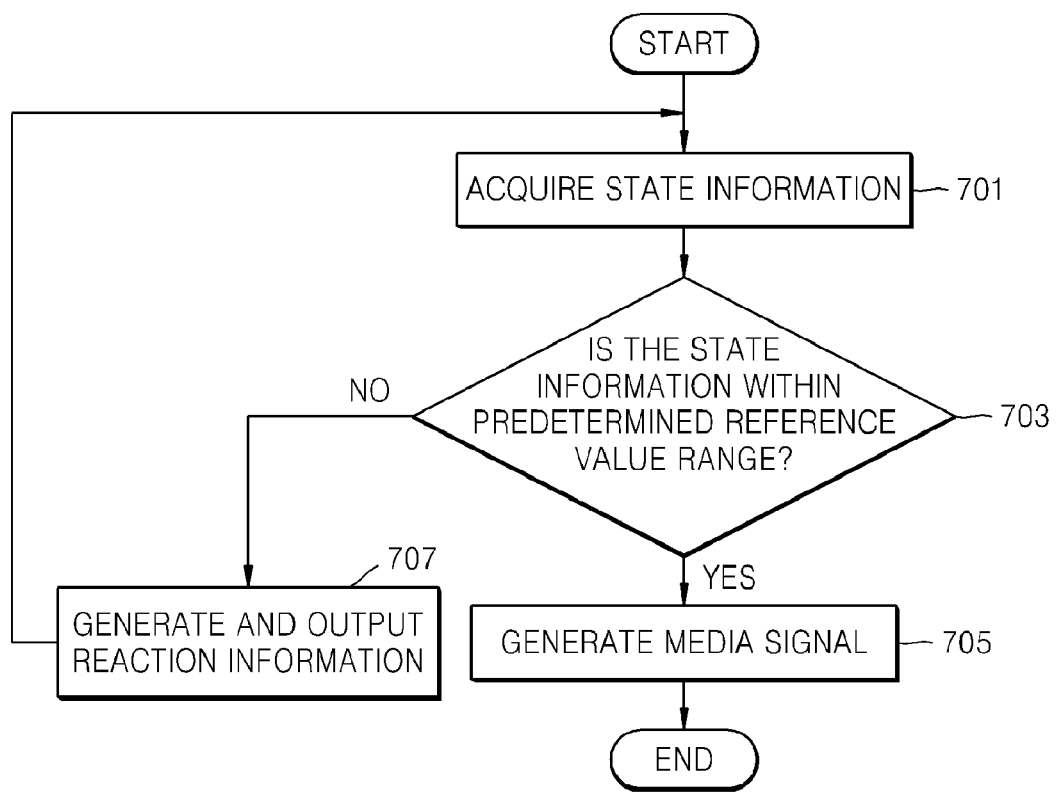
FIG. 7 is a flow chart illustrating a method of generating a media signal by using the apparatus of FIG. 1 or FIG. 2, according to an embodiment of the present invention.

FIG. 7 is a flow chart illustrating a method of generating a media signal by using the apparatus 100 of FIG. 1 or FIG. 2, according to an embodiment of the present invention. Referring to FIG. 7, the apparatus 100 acquires state information about a subject or the apparatus 100 (operation 701). The apparatus 100 determines whether a state information value is within a predetermined reference value range (operation 703). When the a state information value is within the predetermined reference value range, the apparatus 100 captures an image currently viewed on a screen (not shown) of the apparatus 100 and generates a media signal (operation 705). When the state information value is outside the predetermined reference value range, the apparatus 100 generates and outputs reaction information by using the state information value (operation 707).

Figure 8:
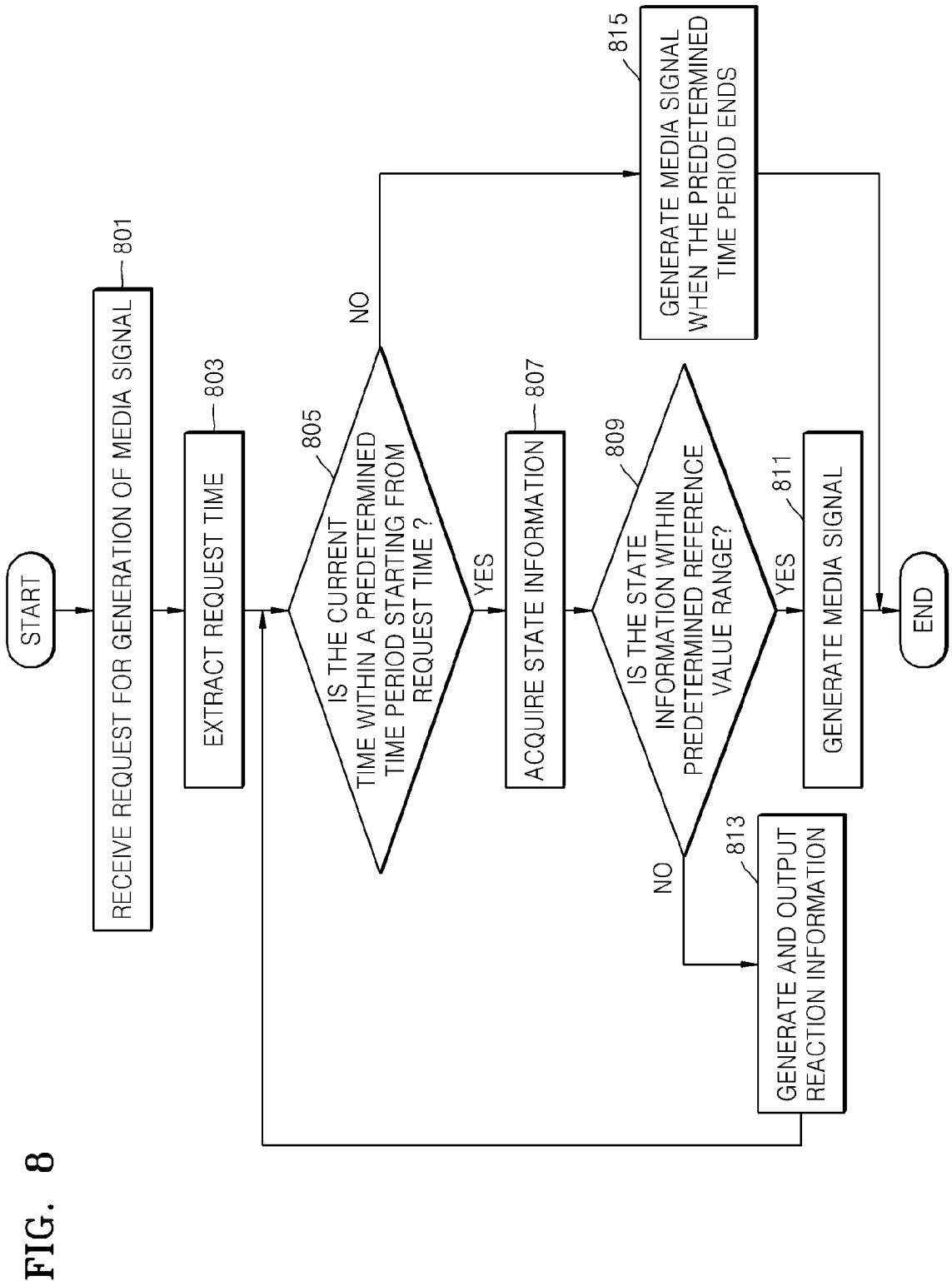
FIG. 8 is a flow chart illustrating a method of generating a media signal by using the apparatus of FIG. 1 or FIG. 2, according to another embodiment of the present invention.

FIG. 8 is a flow chart illustrating a method of generating a media signal by using the apparatus 100 of FIG. 1 or FIG. 2, according to another embodiment of the present invention. Referring to FIG. 8, the apparatus 100 receives through a user interface (not shown), a user's request for formation or generation of a media signal (operation 801), and extracts a request time which is a time when a user requests formation or generation of the media signal (operation 803). The apparatus 100 determines whether a predetermined time period starting from the request time has ended (operation 805). When the predetermined time period starting from the request time has not ended, the apparatus 100 acquires state information of the subject or the apparatus 100 (operation 807) and determines that a state information value is within a predetermined reference value range (operation 809). When the state information value is within the predetermined reference value range, the apparatus 100 captures an image currently viewed on the screen of the apparatus 100 and generates a media signal (operation 811). When the state information value is outside the predetermined reference value range, the apparatus 100 generates reaction information corresponding to the state information (operation 813).

When the predetermined time period starting from the request time ends, the apparatus 100 captures an image viewed on the screen of the apparatus 100 and generates a media signal.

The method and apparatus for generating a media signal by using state information described above can be embodied as a computer-readable code in a computer-readable recording medium. The computer-readable recording medium can be any type of recording apparatuses in which a computer system-readable data is stored. Examples of the computer-readable recording medium include read-only memories (ROMs), random access memories (RAMs), CD-ROMs, magnetic tapes, floppy disks, and optical data storage apparatuses. In addition, the computer-readable recording medium can be dispersed in a computer system connected with a network so that a computer-readable code is stored and executed in a dispersion type. Furthermore, it would be obvious to programmers of ordinary skill in the art to design functional programs, codes, and code segments in order to embody the method of generating a media signal.

According to embodiments of the present invention, a subject or photographer is informed about a state of the camera or subject so that a media signal can be generated when the camera or the subject is in an optimal state.

According to embodiments of the present invention, a media signal can be automatically generated when the camera or the subject is in an optimal state.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of generating a media signal by using an apparatus for generating a media signal, the method comprising:
   acquiring at least one state information selected from state information about a subject and state information about the apparatus; and
   generating a media signal of the subject by using the at least one state information,
   wherein if the value of the at least one state information is outside the predetermined reference value range, generating and outputting reaction information indicating that the value of the at least one state information is outside the predetermined reference value range; and
   wherein if the predetermined time period starting from the request time has not ended, after the reaction information is output, re-acquiring the at least one state information.

2. The method of claim 1, wherein the media signal is generated if a value of the at least one state information is within a predetermined reference value range.

3. The method of claim 2, further comprising:
   receiving a request for a generation of the media signal; and
   extracting a request time when the generation of the media signal is requested, wherein the media signal of the subject is generated during a predetermined time period starting from the request time, if the value of the at least one state information is within the predetermined reference value range.

4. The method of claim 3, further comprising generating a media signal with respect to the subject when the predetermined time period starting from the request time, ends.

5. The method of claim 4, if at least two media signals are generated, further comprising outputting one of the at least two generated media signals.

6. The method of claim 4, wherein the generating of the media signal of the subject when the predetermined time period starting from the request time, ends comprises, if the media signal is not generated during the predetermined time period starting from the request time, generating the media signal when the predetermined time period ends.

7. The method of claim 2, wherein the state information about the subject comprises at least one of information indicating an emotional state of the subject, information indicating whether a face of the subject is completely positioned on a screen of the apparatus, and information indicating whether the subject opens his or her eyes, and
   the state information about the apparatus comprises at least one of information indicating whether the apparatus is in focus and information about an intensity of shaking of the apparatus.

8. The method of claim 2, if the value of the at least one state information is outside the predetermined reference value range, the method further comprises:

generating and outputting reaction information indicating that the value of the at least one state information is outside the predetermined reference value range; and after outputting the reaction information, re-acquiring the at least one state information.

9. The method of claim 8, wherein the reaction information is output as an audio signal through a speaker installed in the apparatus.

10. The method of claim 8, wherein the outputting of the reaction information comprises outputting information indicating whether the at least one state information is within the predetermined reference value range, by using a light emitted from a light emitting diode (LED) installed in the apparatus.

11. The method of claim 8, wherein the outputting of the reaction information comprises outputting a value of the reaction information corresponding to the value of the at least one state information onto a screen of the apparatus.

12. The method of claim 8, further comprising:
receiving a position information about where the subject is positioned on a screen of the apparatus; and
storing the position information, wherein in the acquiring of the at least one state information selected from the state information about the subject, the state information about the subject is a distance between a position of the subject on the screen of the apparatus and a position indicated according to the position information, on the screen of the apparatus.

13. The method of claim 8, further comprising storing a first image information output on the screen of the apparatus, wherein the acquiring of the at least one state information selected from the state information about the apparatus comprises:
comparing a second image information currently output on the screen of the apparatus with the first image information; and
obtaining a degree of similarity between the first image information and the second image information as the at least one state information selected from the state information about the apparatus.

14. An apparatus for generating a media signal, the apparatus comprising:
a state information acquisition unit which acquires at least one state information selected from state information about a subject and state information about the apparatus;
a media signal generation unit which generates a media signal of the subject by using the at least one state information; and
a control unit which controls the media signal generation unit to generate the media signal,
wherein when the value of the at least one state information is outside the predetermined reference value range, further comprising a reaction information output unit which generates and outputs reaction information indicating that the value of the at least one state information is outside the predetermined reference value range, and
wherein when the predetermined time period starting from the request time has not ended, after the reaction information output unit outputs the reaction information, the state information acquisition unit re-acquires the at least one state information.

15. The apparatus of claim 14, further comprising a state information determination unit which determines whether a value of the at least one state information is within a predetermined reference value range, wherein if the value of the at least one state information is within the predetermined reference value range, the control unit controls the media signal generation unit to generate the media signal.

16. The apparatus of claim 15, further comprising a user interface which enables interaction with a user and receives a user's request for generation of a media signal, wherein
the control unit extracts a request time when formation of the media signal is requested, determines whether a predetermined time period starting from the request time, has ended, and, if a predetermined time period starting from the request time has not ended and the value of the at least one state information is within the predetermined reference value range, controls the media signal generation unit to generate the media signal of the subject.

17. The apparatus of claim 16, wherein the media signal generation unit generates a media signal of the subject when the predetermined time period starting from the request time, ends.

18. The apparatus of claim 17, further comprising a media signal output unit which outputs the generated media signal, wherein, if at least two media signals are generated, the media signal output unit outputs one of the at least two generated media signals.

19. The apparatus of claim 17, wherein, if the media signal is not generated during the predetermined time period starting from the request time, the control unit controls the media signal generation unit to generate the media signal when the predetermined time period ends.

20. The apparatus of claim 14, wherein the state information about the subject comprises at least of information indicating an emotional state of the subject, information indicating whether a face of the subject is completely positioned on a screen of the apparatus, and information indicating whether the subject opens his or her eyes, and
the state information about the apparatus comprises at least one of information indicating whether the apparatus is in focus and information about an intensity of shaking of the apparatus.

21. The apparatus of claim 15, if the value of the at least one state information is outside the predetermined reference value range, the apparatus further comprises:
a reaction information generation unit which generates reaction information indicating that the value of the at least one state information is outside the predetermined reference value range; and
a reaction information output unit which outputs the reaction information, wherein
the state information acquisition unit re-acquires the at least one state information after the reaction information is output.

22. The apparatus of claim 21, wherein the reaction information output unit comprises a speaker outputting the reaction information as an audio signal.

23. The apparatus of claim 21, wherein the reaction information output unit comprises an LED which outputs information indicating whether the at least one state information is within the predetermined reference value range, by using light emitted from the LED.

24. The apparatus of claim 21, wherein the reaction information output unit is a screen which outputs a value of reaction information corresponding to the value of the at least one state information.

25. The apparatus of claim 16, wherein the user interface receives position information indicating where the subject is positioned on a screen of the apparatus, and the state information acquisition unit acquires an on-screen distance between a current position of the subject and a position output according to the received position information, as the state information.

26. The apparatus of claim 21, wherein the control unit controls a first image information output on a screen of the apparatus, and the state information acquisition unit acquires a degree of similarity between second image information currently output on the screen of the apparatus and the first image information as the state information.

27. A computer-readable recording medium storing a program for performing a method of generating a media signal by using an apparatus for generating the media signal, the method comprising:

acquiring at least one state information selected from state information about a subject and state information about the apparatus; and generating a media signal by using the at least one state information, wherein if the value of the at least one state information is outside the predetermined reference value range, generating and outputting reaction information indicating that the value of the at least one state information is outside the predetermined reference value range; and wherein if the predetermined time period starting from the request time has not ended, after the reaction information is output, re-acquiring the at least one state information.

28. The method according to claim 1, wherein if the reaction information is regarding state information of the subject, outputting the reaction information audibly so the subject can hear the reaction information.

* * * * *